United States Patent
Tsai et al.

(10) Patent No.: US 6,914,659 B2
(45) Date of Patent: Jul. 5, 2005

(54) LIQUID CRYSTAL DISPLAY PANEL

(75) Inventors: Ching-Yu Tsai, Hsinchu (TW);
Chih-Ming Chang, Jhongli (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 10/693,208

(22) Filed: Oct. 24, 2003

(65) Prior Publication Data

US 2004/0212771 A1 Oct. 28, 2004

(30) Foreign Application Priority Data

Apr. 25, 2003 (TW) .......................... 92109804 A

(51) Int. Cl.$^7$ ............................................ G02F 1/1339
(52) U.S. Cl. ........................................ 349/153; 349/138
(58) Field of Search ................................ 349/153, 138, 349/106, 42, 158, 122

(56) References Cited

U.S. PATENT DOCUMENTS 6,181,405 B1 * 1/2001 Izumi .......................... 349/153
6,400,439 B1 * 6/2002 Fujioka et al. ............... 349/153
6,424,401 B1 * 7/2002 Kang et al. .................. 349/153

* cited by examiner

Primary Examiner—Toan Ton
(74) Attorney, Agent, or Firm—Thomas, Kayden, Horstemeyer & Risley

(57) ABSTRACT

A liquid crystal display (LCD) panel includes an upper substrate, a lower substrate below the upper substrate and a sealant employed between the upper substrate and the lower substrate. There is a first covering layer on the lower substrate and a second covering layer on the first covering layer and wherein the second covering layer has at least an opening, which exposes a portion of the first covering layer. The sealant contacts with the second covering layer and also contacts the portion of the first covering layer via the opening so that the upper substrate and the lower substrate are adhered.

14 Claims, 4 Drawing Sheets

LIQUID CRYSTAL DISPLAY PANEL

This application claims the benefit of Taiwan application Serial No. 92109804, filed Apr. 25, 2003.

BACKGROUND OF THE INVENTION

1. Field of the Invention

The invention relates in general to a flat panel display panel, and more particularly to a liquid crystal display panel.

2. Description of the Related Art

A passivation layer is generally applied over the surface of the thin-film transistor substrate of a typically reflective thin-film transistor liquid crystal display (TFT-LCD) panel or a trans-flective TFT-LCD panel. A photoresist (PR) layer is further disposed on the passivation layer within the active region of the panel and serves to modify the distribution of the reflecting lights. The modification of the reflecting light distribution is accomplished by forming an uneven photoresist layer within the active region of the panel and then forming a metal layer thereon. The photoresist layer surrounded around the active region offers a base for numbers of rod spacers to keep the cell gaps on the edge of the display panel uniform.

Referring to both FIG. 1A and FIG. 1B, the former is a schematic diagram of a conventional LCD panel and the latter is a cross-sectional view of a portion taken along line 1B–1B' of FIG. 1A. A LCD panel 100 includes an upper substrate 110 such as a color filter (CF) substrate and a bottom substrate 120 disposed below the upper substrate, like a TFT substrate. The LCD panel 100 including the CF substrate 110 and the TFT substrate 120 is divided into an active region 130 and a binding area 140. The binding area 140 is surrounded around the active region 130.

Within the binding area 140, sealant 112 is employed and dispensed between the CF substrate 110 and the TFT substrate 120. There is a passivation layer 122 as the first covering layer on the TFT substrate 120 and a photoresist layer 124 as the second covering layer on the passivation layer 122 within the active region 130 and the binding area 140. The passivation layer 122 is made of silicon nitride ($Si_3N_4$) or silicon dioxide ($SiO_2$) and the photoresist layer 124 is made of organic materials.

The photoresist layer 124 above the TFT substrate 120 of a conventional LCD panel contacts with the sealant 112 within the binding area 140. Then the CF substrate 110 and the TFT substrate 120 are pressed by a jig and the LCD panel 100 is baked in ovens to harden the sealant 112 so that the CF substrate 110 and the TFT substrate 120 can be adhered to each other.

The adhesion between the sealant 112 and the photoresist layer 124 is firm and tight. However, the affinity between the photoresist layer 124 and the passivation layer 122 is not so. Due to the particular material characteristics of the photoresist layer 124 and the passivation layer 122, the junction 123 thereof presents low strength. Cracks can easily generate between the photoresist layer 124 and the passivation layer 122 when the LCD panel 100 is subject to an impact test or a vibration test (a dependence test or a fall test). Such cracks will degrade the performance of the LCD panel 100 or further damage the LCD panel 100.

To sum up, low strength is one of the disadvantages of the conventional LCD panel 100, which therefore generates cracks around the junction of the photoresist layer and the passivation layer and causes inferior panel quality.

SUMMARY OF THE INVENTION

In view of the foregoing, it is therefore an object of the invention to provide an improved liquid crystal display (LCD) panel with high strength thereof capable of preventing from generating cracks between the CF substrate and the TFT substrate due to the impact and the vibration of outside influence.

This and other objects are satisfied by the present invention, which relates to a LCD panel that includes an upper substrate, a lower substrate below the upper substrate and a sealant employed between the upper substrate and the lower substrate. There is a first covering layer on the lower substrate and a second covering layer on the first covering layer and wherein the second covering layer has at least an opening, which exposes a portion of the first covering layer. The sealant contacts with the second covering layer and also contacts the portion of the first covering layer via the opening so that the upper substrate and the lower substrate are adhered. The first covering layer is a passivation layer made of silicon nitride ($Si_3N_4$) or silicon dioxide ($SiO_2$) and the second covering layer is a photoresist (PR) layer made of organic materials. The upper substrate is a color filter (CF) substrate and the lower substrate is a thin-film transistor (TFT) substrate.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

Figure 1A:
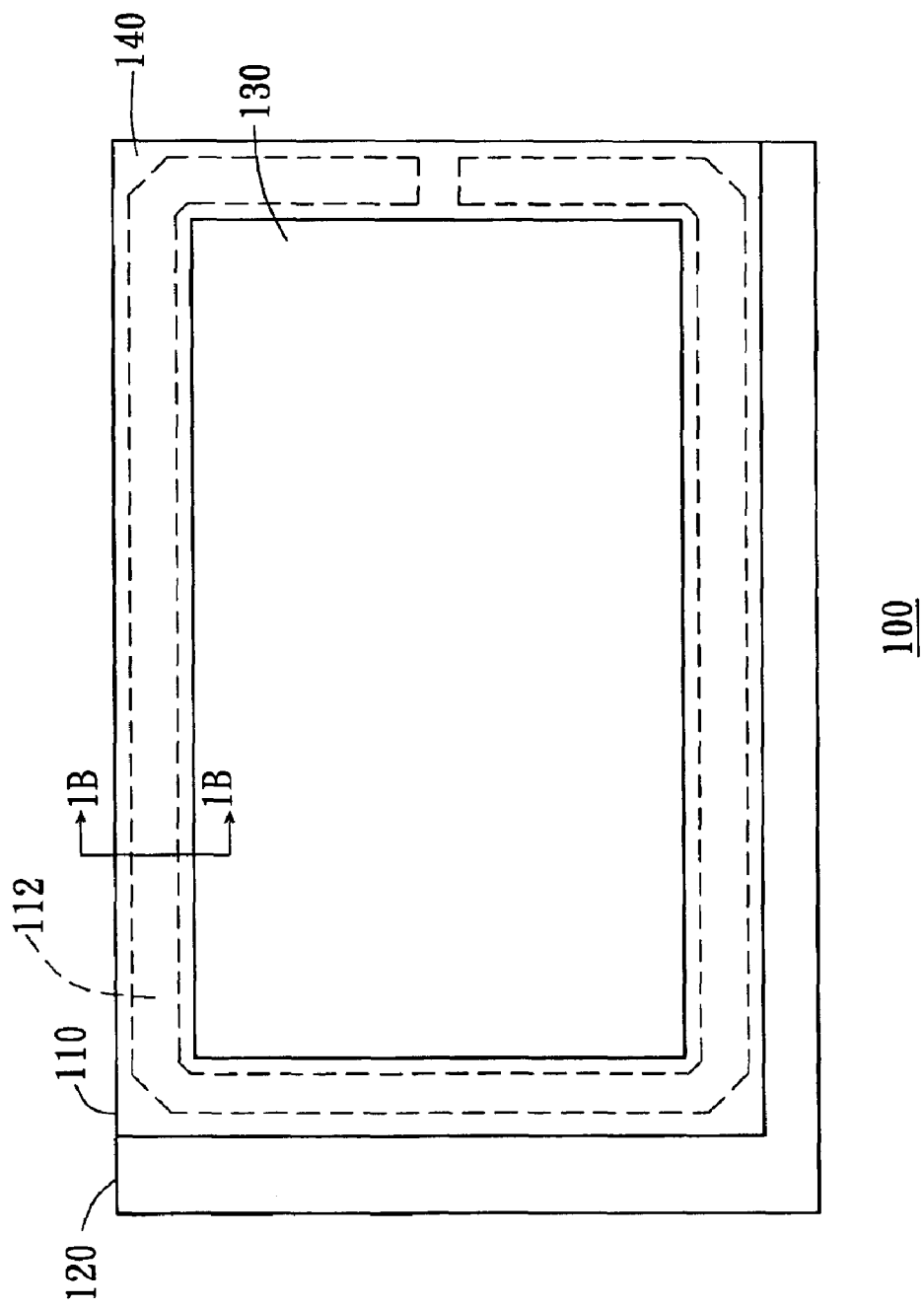
FIG. 1A (Prior Art) is a schematic diagram of a conventional LCD panel.
Figure 1B:
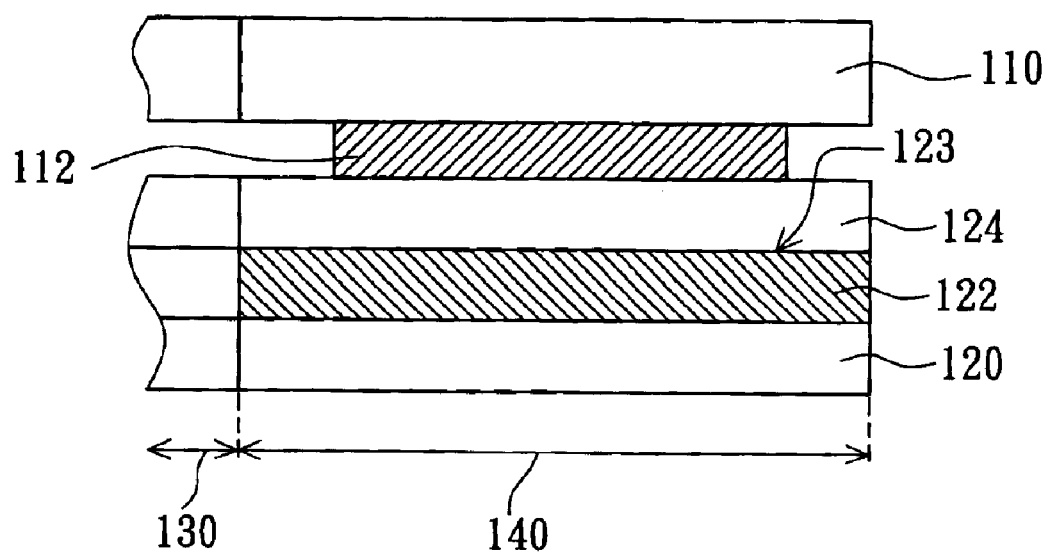
FIG. 1B (Prior Art) is a cross-sectional view of a portion taken along line 1B–1B' of FIG. 1A.
Figure 2A:
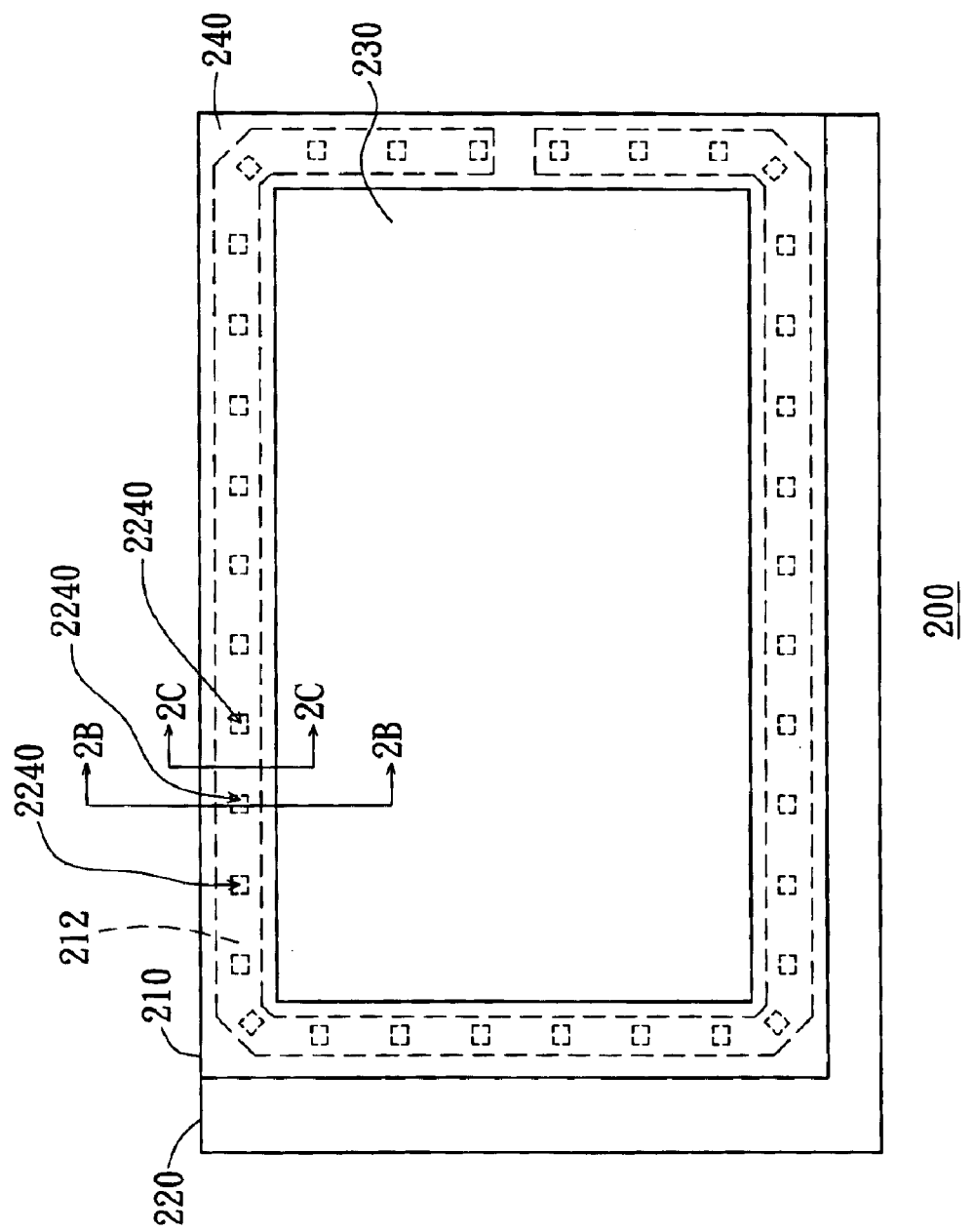
FIG. 2A is a schematic diagram of a LCD panel according to the present invention
Figure 2B:
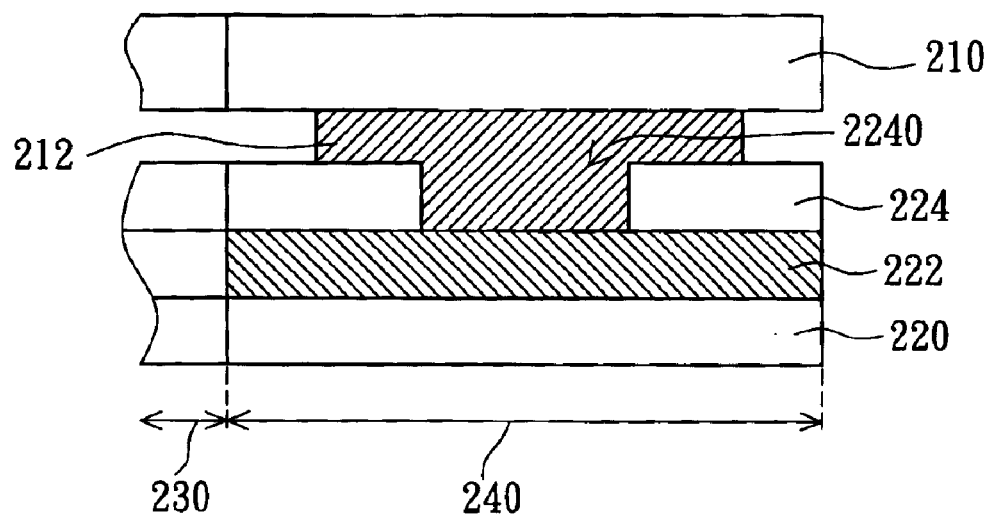
FIG. 2B is a cross-sectional view of a portion taken along line 2B–2B' of FIG. 2A.
Figure 2C:
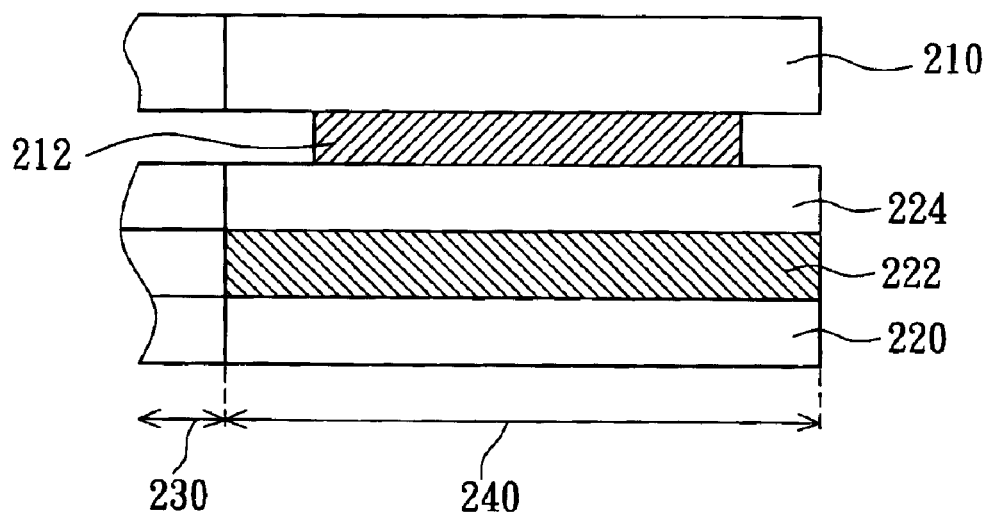
FIG. 2C is a cross-sectional view of a portion taken along line 2C–2C'of FIG. 2A.

FIG. 2A is a schematic diagram of a LCD panel according to the present invention. FIG. 2B and FIG. 2C are cross-sectional views of a portion respectively taken along line 2B–2B' and line 2C–2C' of FIG. 2A. A LCD display panel 200 includes a color filter (CF) substrate as an upper substrate 210 and a TFT substrate as a lower substrate 220 disposed below the upper substrate. Similar to the conventional LCD panel 100, the LCD panel 200 including the CF substrate 110 and the TFT substrate 120 is divided into an active region 230 and a binding area 240. The binding area 240 is surrounded around the active region 230.

Similar to the conventional LCD panel 100, sealant 212 is employed within the binding area 240 and dispensed between the CF substrate 210 and the TFT substrate 220.

There is a passivation layer 222 as the first covering layer on the TFT substrate 220 and a photoresist layer 224 as the second covering layer on the passivation layer 222 within the active region 230 and the binding area 240. The passivation layer 222 is made of silicon nitride ($Si_3N_4$) or silicon dioxide ($SiO_2$) and the photoresist layer 224 is made of organic materials.

The LCD panel 200 of the present invention is different from the conventional LCD panel 100 in possessing at least an opening 2240 in the photoresist layer 224. The openings expose portions of the passivation layer 222. The sealant 212 is employed between the CF substrate 210 and the TFT substrate 220. The sealant 212 contacts with the photoresist layer 224 and also contacts the portion of the passivation layer 222 via the openings 2240 within the binding area 240. Then the CF substrate 210 and the TFT substrate 220 are pressed by a jig and the LCD panel 200 is baked in ovens to harden the sealant 212 so that the CF substrate 210 and the TFT substrate 220 can be adhered to each other. The openings 2240 can be regularly formed in the photoresist layer 224 and beneath the area where the sealant 212 is applied. The openings 2240 can be also formed irregularly but in certain spots within the same area as stated above to enforce the adhesive force particularly. The openings 2240 are supposed to cover 5% to 70% of the area where sealants 212 are applied.

By the aid of the opening 2240 according to the invention, the sealant 212 adheres not only the photoresist layer 224 but also the passivation layer 222 underneath. The adhesion between the sealant 212 and the passivation layer 222 and the adhesion between the sealant 212 and the photoresist layer 224 both contribute to integrate the CF substrate 210 and the TFT substrate 220. The adhesive force between the sealant 212 and the passivation layer 222 is stronger than the adhesive force between the photoresist layer 224 and the passivation layer 222.

As aforementioned, the LCD panel 200 consequently has an improved strength and resistance. As such, when the LCD panel 200 is subject to an impact test or a vibration test (a reliability test or a fall test), cracks won't generate at the junction of the photoresist layer 224 and the passivation layer 222. And the performance of the LCD panel 200 can be further improved.

Therefore, the LCD panel of the present invention has an excellence in higher strength. That's to say that cracks won't generate at the junction of the photoresist layer of the TFT substrate. The present invention can further prevent the occurrence of cracks and therefore improve the quality of the LCD panel.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:

an upper substrate;

a lower substrate below the upper substrate, wherein there is a first covering layer on the lower substrate and a second covering layer on the first covering layer and wherein the second covering layer comprises at least an opening, which exposes a portion of the first covering layer; and a sealant which is employed between the upper substrate and the lower substrate, wherein the sealant contacts with the second covering layer and also contact the portion of the first covering layer via the opening so that the upper substrate and the lower substrate are adhered.

2. The display panel according to claim 1, wherein the first covering layer is a passivation layer.

3. The display panel according to claim 2, wherein the passivation layer comprises silicon nitride (Si3N4).

4. The display panel according to claim 2, wherein the passivation layer comprises silicon dioxide (SiO2).

5. The display panel according to claim 1, wherein the second covering layer is a photoresist (PR) layer.

6. The display panel according to claim 5, wherein the photoresist layer comprises organic materials.

7. The display panel according to claim 1, wherein the upper substrate is a color filter (CF) substrate.

8. The display panel according to claim 1, wherein the lower substrate is a thin-film transistor (TFT) substrate.

9. A liquid crystal display (LCD) panel, comprising:

a color filter (CF) substrate a thin-film transistor (TFT) substrate below the CF substrate, wherein there is a passivation layer on the TFT substrate and a photoresist (PR) layer on the passivation layer and wherein the PR layer comprises a plurality of openings, which expose a portion of the passivation layer; and a sealant which is employed between the CF substrate and the TFT substrate, wherein the sealant contacts with the PR layer and also contact the portion of the passivation layer via the openings so that the TFT substrate and the CF substrate are adhered.

10. The display panel according to claim 9, wherein the passivation layer comprises silicon nitride (Si3N4).

11. The display panel according to claim 9, wherein the passivation layer comprises silicon dioxide (SiO2).

12. The display panel according to claim 9, wherein the photoresist layer comprises organic materials.

13. The display panel according to claim 1, wherein the opening covers 5% to 70% of an area where the sealant is applied.

14. The display panel according to claim 9, wherein the opening covers 5% to 70% of an area where the sealant is applied.

* * * * *